United States Patent Office 3,845,050
Patented Oct. 29, 1974

3,845,050
DIHYDROPYRIDAZONE COMPOUND SUBSTITUTED BY PARAIMIDAZOLIDONYLPHENYL
Rolf Lebkuecher, Horst Koenig, and August Amann, Ludwigshafen, Hubert Giertz, Limburgerhof, and Joerg Schuster, Viernheim, Germany, assignors to Badische Anilin- & Soda-Fabrik Aktiengesellschaft, Ludwigshafen (Rhine), Germany
No Drawing. Filed Oct. 10, 1972, Ser. No. 295,958
Claims priority, application Germany, Oct. 14, 1971, P 21 51 216.3
Int. Cl. C07d 51/04
U.S. Cl. 260—250 A       7 Claims

ABSTRACT OF THE DISCLOSURE

Pharmacologically effective dihydropyridazones which bear a p-imidazolidonylphenyl radical as a substituent.

---

The invention relates to new dihydropyridazones of the formula (I):

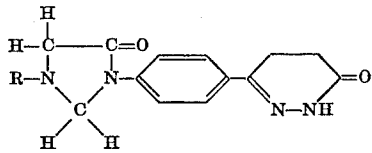
(I)

and methods for their production.

These compounds, in which R is an aliphatic radical, have particular significance as active ingredients in drugs.

The radical R may be saturated or unsaturated. Cycloalkyl radicals are included within the term aliphatic radicals, R may also bear substituents such as phenyl, halogen, alkoxy or dialkylamino. The phenyl radical may also bear these substituents. R is preferably alkyl such as ethyl, cycloalkyl or aralkyl. Preferred unsaturated radicals R are olefinic radicals but acetylenic radicals are also suitable. The unsaturated bonds may be present twice or more than twice and may be conjugated. Preferred aliphatic radicals R are those of one to eight carbon atoms, particularly saturated, and of these the cyclohexyl radical is preferred. The phenyl radical is the preferred substituent.

The new compounds are obtained by reacting a dihydropyridazone of the formula (II):

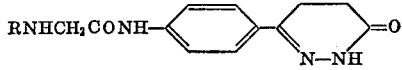
(II)

or a corresponding succinic acid derivative of the formula (III):

(III)

with formaldehyde and, when compound (III) is used, cyclizing the resultant compound (IV)

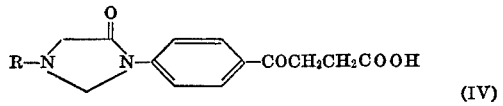
(IV)

with hydrazine to form compounds of the formula (I).

Instead of the free acids (III) and (IV), the esters thereof, particularly low alkyl esters, for example ethyl esters, may be used.

Reaction of compound (II) or (III) with formaldehyde (which may be used in the form of its aqueous solution or in polymerized form) is conveniently carried out in a liquid which does not disturb the reaction, such as water, methanol, ethanol, dioxane, benzene, xylene or in a mixture of such liquids and advantageously at a temperature of from 50° to 140° C.

Compounds of formula (II) to be used as starting materials may be obtained by reaction of the dihydropyridazone (V):

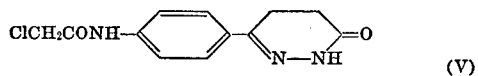
(V)

with the appropriate amine: $RNH_2$.

The compound (V) may in turn be obtained by a conventional method from the dihydropyridazone (IV):

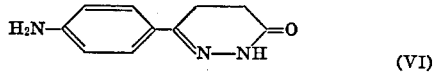
(VI)

and chloroacetyl chloride. (VI) may in turn be obtained according to German Laid-open Specification 1,670,158.

The following are examples of individual compounds, DHP being an abbreviation for 3-p-(4,5-dihydropyridazon-3-yl-6)-phenyl-imidazolidone-(4):

| | |
|---|---|
| 1-methyl-DHP | $R=CH_3-$ |
| 1-ethyl-DHP | $R=C_2H_5-$ |
| 1-propyl-DHP | $R=CH_3CH_2CH_2-$ |
| 1-n-butyl-DHP | $R=CH_3CH_2CH_2CH_2-$ |
| 1-isobutyl-DHP | $R=CH_3-CHCH_2-$<br>$\quad\quad\quad\quad\;\; |$<br>$\quad\quad\quad\quad CH_3$ |
| 1-tertiary-butyl-DHP | $R=(CH_3)_3C-$ |
| 1-isoamyl-DHP | $R=\quad CH_3$<br>$\quad\quad\;\; |$<br>$CH_3-CHCH_2CH-$ |
| 1-(1-methylbutyl)-DHP | $R=CH_3CH_2CH_2CH-$<br>$\quad\quad\quad\quad\quad\quad\; |$<br>$\quad\quad\quad\quad\quad\quad CH_3$ |
| 1-(1-ethylpropyl)-DHP | $R= \begin{array}{c} CH_3CH_2 \\ \diagdown \\ CH_3CH_2 \end{array} CH-$ |
| 1-(2-hydroxyethyl)-DHP | $R=HOCH_2CH_2-$ |
| 1-allyl-DHP | $R=CH_2=CHCH_2-$ |
| 1-(2-butynyl)-DHP | $R=CH_3-C\equiv C-CH_2-$ |
| 1-n-octyl-DHP | $R=CH_3(CH_2)_7-$ |
| 1-cyclopentyl-DHP | $R=$ ⬠- |
| 1-cyclooctyl-DHP | $R=$ ⬭ |
| 1-(2-methoxyethyl)-DHP | $R=CH_3OCH_2CH_2-$ |
| 1-(3-ethoxypropyl)-DHP | $R=C_2H_5OCH_2CH_2CH_2-$ |
| 1-(2-dimethylaminoethyl)-DHP. | $R=(CH_3)_2NCH_2CH_2-$ |
| 1-(3-dimethylaminopropyl)-DHP. | $R=(CH_3)_2NCH_2CH_2CH_2-$ |
| 1-(1-methyl-4-diethylaminobutyl)-DHP. | $\quad\quad\quad\quad\quad\quad\quad\quad\quad CH_3$<br>$\quad\quad\quad\quad\quad\quad\quad\quad\quad\; |$<br>$R=(C_2H_5)_2NCH_2CH_2CH_2CH-$ |

The compounds of the formula (I) may if desired be converted with physiologically compatible inorganic or organic acids by a conventional method into their acid addition salts. Hydrochloric, sulfuric, phosphoric, acetic, citric, tartaric, maleic, fumaric and malic acid are examples of suitable acids for this purpose.

The compounds of this invention have valuable pharmaceutical properties. In particular they have cardiovascular and antiinflammatory effects. In this connection the compounds in which R=isopropyl or isobutyl are particularly important. Suitable formulations are for example those conventional for peroral administration or suppositories. Formulations containing the new compounds as active ingredients may be obtained by methods known in the art in accordance with the method of administration desired.

The following Examples illustrate the invention.

EXAMPLE 1

1 - isopropyl-3-p-(4,5-dihydropyridazon-3-yl-6) - phenyl-imidazolidone-(4):

14.4 g. (0.05 mole) of 6-p-(isopropylaminoacetylamino)-phenyl - 4,5 - dihydropyridazone-(3) is heated under reflux with 37.5 g. (0.5 mole) of 40% aqueous formaldehyde solution and 150 ml. of ethanol for one hour. The whole is suction filtered at 0° C., washed with cold ethanol and dried at 70° C. at subatmospheric pressure. The yield is 9.3 g. (62% of theory). After recrystallization from propanol the melting point is 208° to 210° C. The following further compounds, given by way of example, may be prepared in an analogous manner:

| Ex. | R | Melting point, °C. | Recrystallized from— |
|---|---|---|---|
| 2 | $C_2H_5-CH-$<br>$\phantom{C_2H_5-}CH_3$ | 180.5–181.5 | Ethyl acetate. |
| 3 | 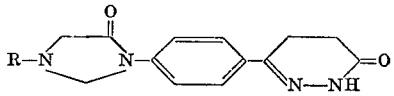 | 226–228 | Propanol. |
| 4 | $C_6H_5CH_2-$ | 198–199 | Dimethylformamide and water. |
| 5 | $C_6H_5CH_2CH_2-$ | 196–197 | Propanol. |

We claim:
1. A compound of the formula

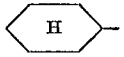

in which R is alkyl of 1 to 8 carbon atoms or said alkyl mono substituted by phenyl, methoxy, ethoxy or hydroxy; cycloalkyl of 5 to 8 carbon atoms; allyl; or butynyl; and the pharmaceutically compatible acid addition salts of said compound.

2. A compound as claimed in Claim 1 wherein R is alkyl of 1 to 8 carbon atoms; said alkyl mono substituted by phenyl; or cycloalkyl of five to eight carbon atoms.

3. A compound as claimed in Claim 1 wherein R is cyclohexyl.

4. A compound as claimed in Claim 1 wherein R is benzyl.

5. A compound as claimed in Claim 1 wherein R is phenylethyl.

6. The compound of the formula:

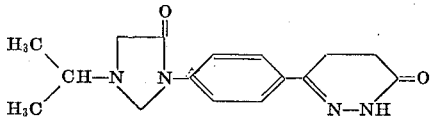

7. The compound of the formula:

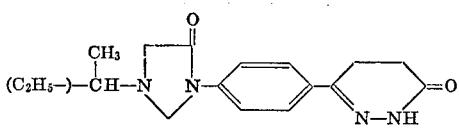

References Cited

UNITED STATES PATENTS

| | | | |
|---|---|---|---|
| 3,475,431 | 10/1969 | Bachmann | 260—250 |
| 3,487,081 | 12/1969 | Bachmann | 260—250 |
| 3,014,034 | 12/1961 | Druey | 260—250 |

FOREIGN PATENTS

| | | | |
|---|---|---|---|
| 2,123,246 | 11/1972 | Germany | 260—250 A |

OTHER REFERENCES

Schuette, Chemical Abstract 71: 36485S (1969).

DONALD G. DAUS, Primary Examiner

R. D. McCLOUD, Assistant Examiner

U.S. Cl. X.R.

260—518 A, 518 R, 519 R; 424—250